Nov. 18, 1930.  F. T. SNYDER  1,781,934
PROCESS OF DISTILLING MATERIAL AND CRACKING OIL
Filed June 8, 1925
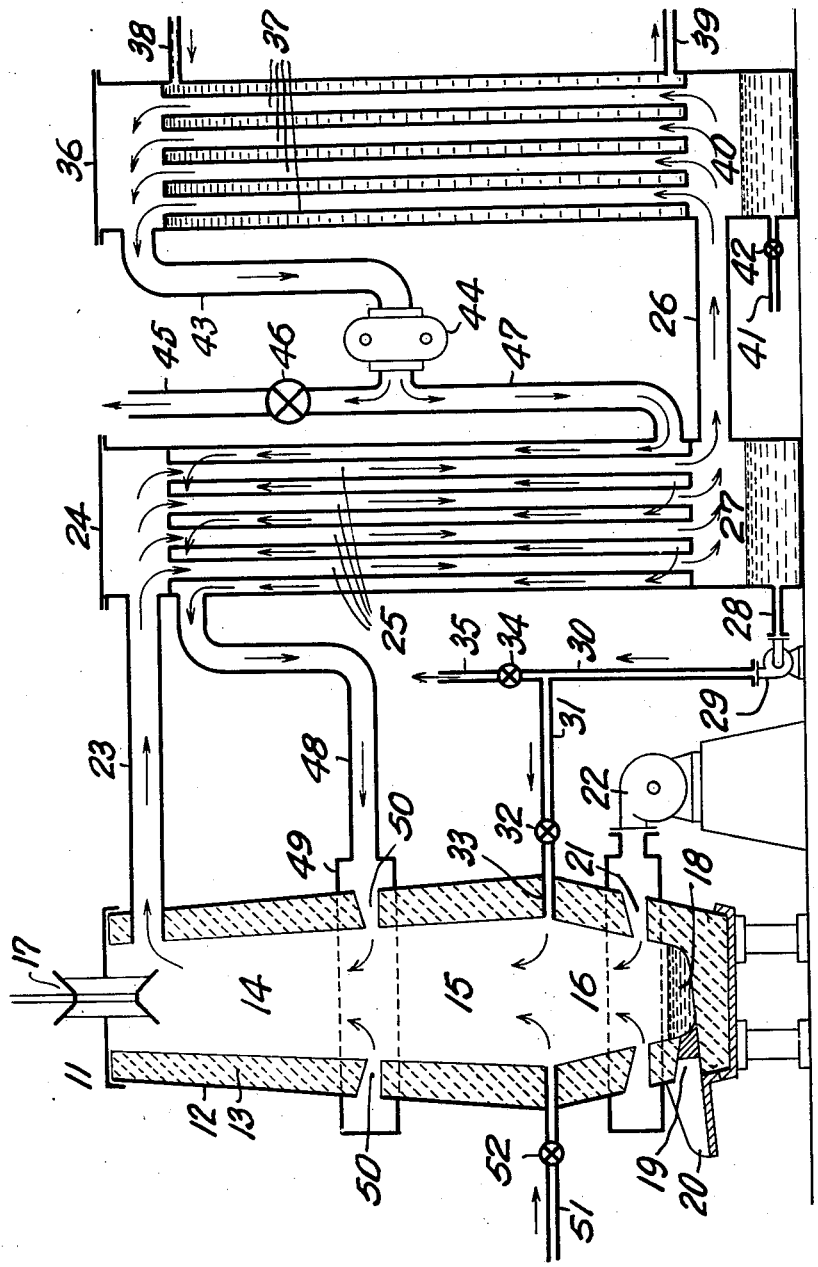
Inventor
Frederick T. Snyder
By
Attorney Patented Nov. 18, 1930

1,781,934

UNITED STATES PATENT OFFICE

FREDERICK T. SNYDER, OF NEW CANAAN, CONNECTICUT

PROCESS OF DISTILLING MATERIAL AND CRACKING OIL

Application filed June 8, 1925. Serial No. 35,804.

This invention relates broadly to a process of and to apparatus for the evaporative decomposition or distillation of raw materials which are wholly or partly volatile for the production of light oils, the said process of decomposition or distillation being more fully set forth in my copending applications, Serial Numbers 35,802, 35,803 and 35,805, filed of even date herewith. More particularly the invention relates to the cracking of oils whether supplied from an external source or produced by distillation in the operation of the process.

The primary object of the invention is the provision of means to obtain a large yield of light oils from heavier oils of solids containing volatile constituents, in an economical and expeditious manner.

A further object is to provide for the recovery from the material distilled or cracked of a large amount of valuable constituents in the form of by-products such as ammonia, fuel or illuminating gas and the like.

A still further object is to provide for the recovery of valuable constituents from bituminous coal or from waste materials such as garbage, sawdust and the like, and also for the distillation of oil shales.

Various other objects may be ascertained from the following description which, for simplicity and brevity relates in detail to only one manner of putting the invention into practice.

Briefly described, the invention resides in subjecting material having volatile constituents, such as bituminous coal, garbage, wood waste (sawdust, shavings, bark, etc.) or oil shales to a low temperature, distilling operation in which substantially all of the volatile constituents are extracted in a large volume of gas, part of which is gaseous products of combustion, and part oil vapors and generated gas, and the remainder a substantially constant volume of circulating gas. The solid residue of the distillation (except in the case of shale) is burned to provide the heat necessary for distillation and for cracking some of the distillation products. The circulating gas and the vapors from the distilling operation are subjected to a fractional condensing operation and the heavier oils thus recovered are exposed to the hot gaseous products of combustion for cracking and for the further purposes of cooling these gases to the temperature desired for the distilling operation and of providing a part of the large volume of gases and vapors employed in the distilling operation. Where the amount of heat generated and the volume of gas circulated are sufficient, heavy oil from an outside source may be cracked along with the oil distilled. The gaseous and vaporous products leaving the condensing operation are washed by any of the well known methods for recovery of oils which do not condense and also of ammonia. Most of the gaseous product is available as fuel or for illumination. The circulating gas is used as a cooling agent in one stage of the condensing operation and takes up, for return to the distilling operation, much of the sensible heat of the gases and vapors leaving the distilling operation.

The process can be carried on in several different kinds of equipment. For the purpose of explanation the description will be confined to the manner of operation using a retort of the vertical shaft type.

The accompanying diagrammatic drawing illustrates this type of retort and attendant apparatus. The retort 11 comprises a gas tight shell 12 lined with refractories 13. The interior of the retort, in effect, includes three zones, namely, a distilling zone 14 at the top, a cracking zone 15 in the centre and a combustion zone 16 at the bottom. Above the distilling zone is a feeder 17 arranged to permit the entrance of fuel without permitting the escape of gas. At the bottom of the combustion zone is a crucible 18, in which the fused ash from the fuel accumulates and from which it is periodically tapped through a tap hole 19 and a slag spout 20. Near the base of the combustion zone air is supplied through tuyères 21 from a blower 22. The gases resulting from the combustion of the fuel with this air, which are essentially producer gas, ascend through the fuel and leave the retort above the distilling zone through a pipe 23.

Through this pipe the gases are delivered into a heat exchanger 24, in which the gases flow down inside the tubes 25 and are cooled to a considerable extent, leaving the exchanger through a pipe 26. The partial cooling of the gas causes the condensation of the oil vapors, with low boiling temperatures, carried by the gases from the retort. These condensed oils run down inside the tubes and collect in a reservoir 27 at the base of the exchanger. The accumulated oil is withdrawn from this reservoir through a pipe 28, by a pump 29 and delivered into the pipe 30. A portion of this oil is discharged into the retort at the top of the combustion zone, through the pipe 31, the valve 32 and the oil tuyère 33. The remainder is sent forward through the valve 34 and pipe 35 into storage.

The oil as it enters the retort is vaporized by the heat and these vapors mix with the hot combustion gases rising from the combustion zone. These gases are at a temperature of some 1000° F. The cracking temperature of most oils is below 600° F., so that these oil vapors are at once cracked into oil vapors having lower boiling points. This cracking produces free carbon, which deposits on the fuel and is carried down into the combustion zone and burned with the fuel.

The partially cooled gas leaving the exchanger by the pipe 26, enters condenser 36 in which the gas is further cooled in the tubes 37, which are surrounded by water, which enters cold through a pipe 38 and is withdrawn when heated through a pipe 39. The light oils which condense out of the gas in this condenser run down the inside of the tubes and accumulate in a reservoir 40 in the bottom of the condenser from which these light oils are removed through a pipe 41 controlled by a valve 42.

The cooled gas is withdrawn from the condenser through a pipe 43 by means of an exhauster 44. Part of the gas from this exhauster is removed for use outside this system through a pipe 45, the amount removed being regulated by a valve 46. The part not removed passes through the pipe 47 into the heat exchanger outside of the tubes. Here it is heated by the heat given up by the top gas of the retort including the heats of vaporization of the oil vapors which condense in the exchanger. The reheated gas passes through a pipe 48, a bustle pipe 49 and tuyères 50 back into the retort at the junction of the cracking zone and the distilling zone.

The fuel enters the top of the retort at atmospheric temperature and as it sinks down, due to the combustion of the fuel at the bottom of the retort, it is heated by absorbing heat from the upcoming gas. This absorption of heat by the fuel cools the gas. As the gas cools there is a tendency for the oil vapors with the highest boiling temperatures to condense out and deposit on the fuel. As the fuel comes down such condensed oils, would when they reach a region of sufficient temperature, again vaporize and be carried up once more. Unable therefore to leave this region either at the top or bottom, such high boiling temperature oils would accumulate in this region and would eventually stick the fuel together and prevent its orderly downward movement and at the same time hinder the upward passage of the gases through the fuel.

The return of the reheated gases from the exchanger to the base of the distilling zone prevents any such interference due to condensation, by increasing the relative volumes of gas to vapor. This reduces the partial pressures of the vapors and lowers the temperatures at which they condense. By returning a sufficient volume of gas to the base of the distilling zone, as is done in the practice of this invention, the condensing temperature of practically all the vapors can be lowered below the temperature at which the gases leave the retort, so that practically no oil condenses on the incoming fuel.

The combustion of the fuel in the combustion zone liberates a definite limited amount of heat per unit weight of fuel. The lower the temperature at which the top gases can leave the retort the less heat these gases will carry away and the more heat is available for the vaporization and cracking of oil. Where a considerable volume of gas is returned at the base of the distilling zone, more oil can be vaporized and cracked than is returned from the base of the heat exchanger. Additional oil can therefore be introduced from an outside source through a pipe 51 regulated by a valve 52.

The introduction of such additional oil has the effect of keeping down the temperature of the gases in the distilling zone. This permits the use of economical fuels, such as high volatile coal, which in the raw condition would fuse at low temperatures and stick up the operation of the retort. After the oils of such fuels have evaporated, their fusion temperature becomes higher than their temperature of decomposition, and there is then no opportunity for fusion, after they leave the distilling zone.

In the case where a material of extremely high volatile contents, such as garbage, is used as fuel in this process, the heat absorbed in vaporizing the large amount of volatiles makes is unnecessary to inject any other cooling fluid. It is, however, essential that the temperature at which the gases leave the retort should be low enough not to decompose the valuable animal and vegetable oils from the garbage, and at the same time sufficient in volume to prevent any substantial amount of these oils from condensing at this low temperature. This required volume is obtained by the gas returned to the retort below the distillation zone.

In the case where no outside oil is introduced and the process is operated only for the recovery of the oils which exist naturally in the fuel, this cooling effect can be obtained by introducing water through the pipe 51. If steam is available as a waste product, such as exhaust steam, it also can be introduced in place of the additional oil or additional oil and other cooling medium can be used jointly.

Since the steam or other cooling fluid is introduced at the top of the combustion zone, it does not cool the bottom of the combustion zone and therefore does not interfere with a ready slagging of the ash of the fuel.

By working according to this process a very high yield of light oils may be obtained, both from the material distilled and from additional oil cracked.

The decomposition of the fuel releases ammonia, which can be absorbed with sulphuric acid in the usual ways by a washing tower (not shown) in the gas circuit between the condenser and exhauster. Following the ammonia recovery, the cleaned gas can also be washed with oil to absorb the high boiling temperature oils which do not condense in the condenser.

If the process is operated for the distillation of oil shales, fuel such as bituminous coal may be supplied with the shale and the design of the retort must be such as will permit of the discharge of the large amount of solid and incombustible residue.

It must be understood that while only one method of operation and one form of apparatus have been described in detail, the invention is not limited to the specific details disclosed but contemplates many modifications and variations to adapt the process to special conditions and in accordance with the products desired, the essential feature being the successive distillation of oil from and cracking of oil in a charge of distillable material, and the use of the cracked oil vapors with gaseous combustion products and additional gas to enable a low temperature distillation without accompanying detrimental condensation.

Having thus described my invention, what I claim is:—

1. A process of obtaining volatiles from distillable solid carbonaceous material, which comprises, feeding an autothermic retort with the solid material, distilling said material by passing in contact therewith hot non-oxidizing gas, burning the solid residue from said distillation in the base of said retort with a blast of air to supply said non-oxidizing gas and the heat required for distillation, fractionally condensing the vapours evolved by the distillation operation, injecting the heavier fractions at a point above the zone of combustion into the solid material undergoing distillation to act as part of a cooling fluid and to undergo cracking and distillation, heating the uncondensed gases and injecting them, at a point above the point of injection of said heavier condensate, into said solid material undergoing distillation to aid the distillation.

2. A process of obtaining volatiles from distillable solid carbonaceous material which comprises distilling said material by passing in contact therewith hot non-oxidizing gas, burning the solid residue of the distillation, cooling the gaseous products of said combustion by injecting cooling fluid into said gaseous products after they leave the combustion zone and passing said gaseous products of combustion and of the cooling fluid into contact with solid distillation residue prior to combustion thereof, and further cooling said gaseous products of combustion and of the cooling fluid by adding thereto, after contact with said solid distillation residue, cooler non-oxidizing gas derived from previous distillation and combustion of solid distillation residue, and passing said combined gases exclusively in contact with material in process of distillation.

3. A process according to claim 2, in which the cooling fluid includes the heavier fractions of condensate derived from previous distillation.

4. A process according to claim 2, in which the cooling fluid includes steam.

5. A process according to claim 2, in which the cooling fluid includes steam and the heavier fractions of condensate derived from previous distillation.

6. A process according to claim 2, in which the cooling fluid includes the heavier fractions of condensate derived from previous distillation and in which the heavier fractions of condensate are cracked in contact with the solid material in the later stages of distillation with production of gaseous and vaporous constituents and solid constituents.

7. A process according to claim 2, in which the amount of gas last added and passed in contact with the material undergoing distillation is such that the volatiles of highest boiling temperature distilled from said material will not condense upon the material last added.

8. A process of obtaining volatiles from distillable solid carbonaceous material which comprises distilling the solid material by passing hot gases in contact therewith, injecting oil into the solid residue of such distillation and cracking the oil in contact with said solid residue with production of further solid residue, burning the solid residues of the distilling and cracking operations to provide the heat and gases necessary for distillation and the heat necessary for cracking and cooling the gases and vapours evolved from said combustion and cracking by adding thereto prior to passage in contact with material undergoing distillation cooled gases derived from previous combustion of distillation residue.

9. A process according to claim 2, in which the volume and temperature of the gas and vapour mixture in contact with material undergoing distillation is such that the distillation is effected below the fusing temperature of the material.

10. A process of obtaining volatiles from distillable solid carbonaceous material, which comprises, distilling said material by passing hot gases in contact therewith, cracking oil by injecting the same into the hot solid residue of said distillation and burning said residue with air after the cracking operation to provide said gas for distillation and the heat necessary for said cracking and distillation, absorbing a portion of the heat of said combustion prior to use thereof for cracking by mingling an aqueous cooling agent with the hot gaseous products of said combustion prior to their contact with the solid distillation residue, and further cooling said gaseous products of combustion and the vaporous products of said cracking by mingling therewith prior to contact with material undergoing distillation cooler gas produced by previous combustion of solid distillation residue.

In witness whereof, I have hereunto set my hand.

FREDERICK T. SNYDER.